United States Patent Office

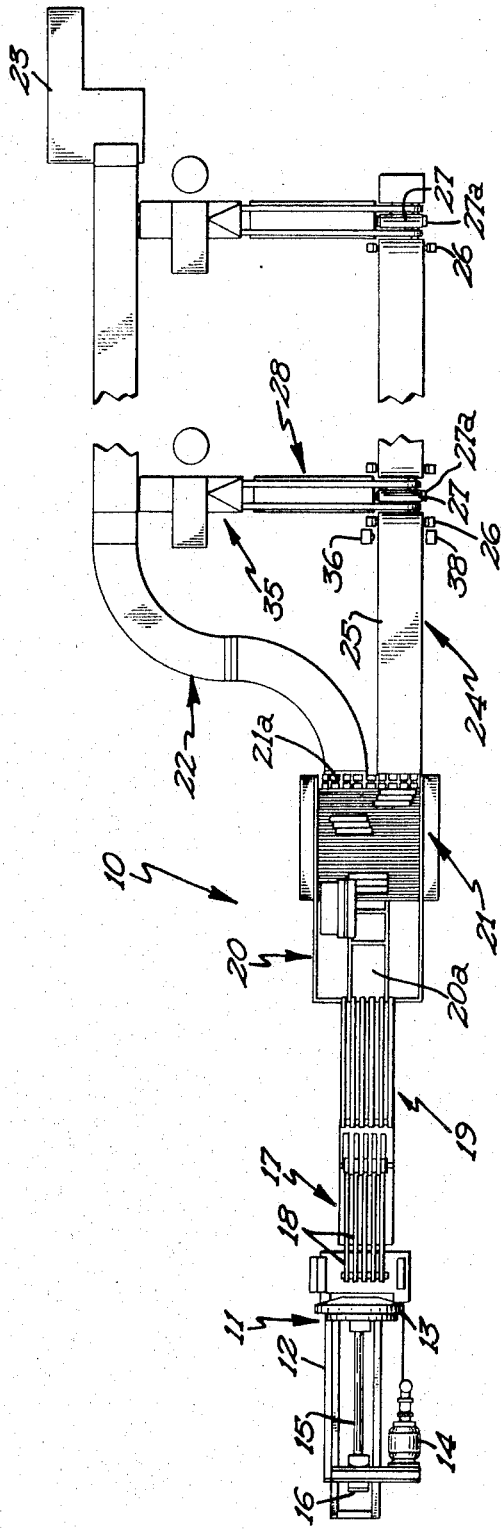

3,730,742
Patented May 1, 1973

3,730,742
PROCESS AND APPARATUS FOR SLICING AND WEIGHING BACON FOR PACKAGING
Jean A. Burton, T. Stanley White, and Harold M. Myrland, Austin, Minn., assignors to Geo. A. Hormel & Co., Austin, Minn.
Filed May 12, 1971, Ser. No. 142,557
Int. Cl. B26d 4/24
U.S. Cl. 99—233.11        6 Claims

ABSTRACT OF THE DISCLOSURE

A process and apparatus for slicing and weighing bacon for packaging comprises slicing and placing bacon in shingle fashion on a sheet of packaging material and conveying these sheets with the bacon slices thereon to a weighing station. Each sheet is weighed to determine if the weight of each sheet is below a predetermined weight, and those sheets that have a weight at least equal to the predetermined weight are directed by a conveyor to a packaging station where these sheets are packaged. Those sheets with bacon slices thereon that have a weight below said predetermined weight are mechanically moved to a reject conveyor which is comprised of a plurality of endless conveyors arranged in end-to-end relation. Transverse conveyors are interposed between the endless conveyor members of the reject conveyor and are normally disposed in a lower inoperative position but are vertically shiftable to an upper operative position to remove weight deficient sheets of bacon from the reject conveyor and direct the same to a weight adjusting station. At the weight adjusting station the weight of each weight deficient sheet is adjusted to equal the predetermined weight, and the sheets thereafter directed by a conveyor to the packaging station.

SUMMARY OF THE INVENTION

In conventional bacon slicing and packaging systems, slabs of bacon are cut into thin slices and a plurality of these slices are placed in shingle fashion upon a sheet of packaging material. The sheets are then moved along a conveyor where the sheets are manually removed from the conveyor and weighed to determine if each sheet is of a predetermined minimal weight. In this system, the conveyor is moved adjacent to a plurality of weighing stations where each worker removes the packages and performs the weighing and/or the weight correcting function. The weighing stations are located longitudinally along the conveyor and in order to properly distribute the work equally, each worker must also count the number of sheets with bacon slices thereon as they are moved by each worker along the conveyor. In this arrangement, the workers not only weight every sheet but also count the number of sheets of bacon to be weighed, as the sheets are moved by the conveyor.

It is therefore a general object of this invention to provide a process and apparatus which is operable to select those sheets with bacon slices thereon that are weight deficient and to direct these sheets automatically to a weighing station where the weight can be adjusted. In this system, the work is evenly distributed among the workers and the necessity of counting the weight deficient sheets is eliminated. Further, those sheets with bacon slices thereon, which meet the minimal weight standards, are not required to be weighed, since this function is performed automatically in an initial weighing and selecting step of the present system.

Thus the present system provides a highly efficient process and apparatus for slicing bacon, for weighing the bacon, and for adjusting weight deficient slices of bacon in preparation for packaging.

BRIEF DESCRIPTION OF THE FIGURES OF THE DRAWING

FIG. 1. is a diagrammatic top plan view of the apparatus foreshortened for clarity;

FIG. 2 is a fragmentary perspective view of a portion of the apparatus illustrating the relationship of certain parts thereof; and FIG. 3 is a side elevational view of that portion of the apparatus illustrated in FIG. 2.

DETAILED DESCRIPTION OF THE INVENTION

Referring now to the drawings and more specifically to FIG. 1, it will be seen that one embodiment of the apparatus, designated generally by the reference numeral 10, for carrying out the present process is there shown. This apparatus includes a bacon slicing device 11 which is a commercial type, and, in the embodiment shown, is a bacon slicing device manufactured by Allbright-Nell Company and referred to in the trade as Anco 8276 Continuous Feed Bacon Slicer. This slicing device includes a frame 12 which mounts a slicer mechanism 13 comprised of a revolvable blade which is driven by an electric motor 14. The motor actually drives an elongate revolvable drive shaft 15 through a gear box 16, and the shaft 15 drives the blade. A carriage is mounted on the frame and is adapted to force a slab of bacon into position to be sliced by the revolving blade. The slab of bacon to be cut is urged forwardly and successive slices are made along the forwardly positioned edge of the slab. The slices are adapted to fall in shingled relation upon the upper run of a shingling conveyor 17.

The shingling conveyor is comprised of a plurality of endless conveyor ribbons or elements 18 which are trained about endless rollers and which support the slices of bacon B and move the slices of bacon towards conveyor 19. The shingling conveyor is preferably of the type also manufactured by Allbright-Nell Company and generally known in the trade as 222–12 Anco Shingling Conveyor. An operator selects the correct number of slices of bacon from the shingling conveyor and places these slices on a sheet of paper S and the sheets of paper S are stored underneath the downstream end of the shingling conveyor 18 between the shingling conveyor and the removal conveyor 19. An operator is positioned adjacent the juncture between the shingling conveyor and the removal conveyor and this operator selects the correct predetermined number of slices and slides this group of shingle slices from the shingling conveyor upon the removal conveyor. During this operation, a cardboard sheet S is automatically positioned in supporting relation with respect to this group of slices and this sheet with the slices thereon is then moved toward the weighing device 20.

The removal conveyor 19 is also a ribbon type endless conveyor and is comprised of a plurality of endless ribbon elements trained about suitable rollers. The removal conveyor 19 is disposed in end-to-end relation with respect to the shingling conveyor 17.

The removal conveyor 19 conveys the sheets to a weighing device 20 where the sheets are automatically weighed. In this regard, the weighing device 20 is generally known in the trade as a Serial 500 Illumitronic Checkweigher and is manufactured by Icore Industries. The sheets S with bacon slices thereon are spaced apart from each other and each sheet is positioned along the weighing device 20 by a movable conveyor 20a which is a part of the weighing device and which supports the sheets as they are being weighed. The weighing device 20 weighs each sheet and determines if each sheet with bacon slices thereon is equal to a predetermined minimal weight. The sheets of bacon which at least equal the predetermined minimal weight are transferred by a directional control device 21, to a product acceptance conveyor 22 where the bacon is conveyed to a packaging station 23. The product acceptance conveyor may be a conventional conveyor system using endless apron conveyor members arranged in end-to-end relation which conveys the sheets to the packaging station 23. However, in the event that the sheets of bacon are less than the predetermined weight, these sheets are directed to a reject conveyor 24 by the directional control device 21. The directional control device which is known in the trade as a channelizer is manufactured by Icore Industries and serves to move the bacon slices in a downstream direction from the weighing device but also serves to move the weight deficient sheets towards the reject conveyor in response to a signal from the weighing device when the sheets are less than said predetermined weight. In this regard, laterally moving conveyor elements 21a guide the weight deficient sheets to the reject conveyor 24 when the weighing device determines that a sheet is less than said predetermined weight.

The reject conveyor 24 is made up of a plurality of endless conveyor aprons or members 25 which are trained by suitable conveyor rolls in a well-known manner. Each of these endless conveyor aprons is supported by a frame or support members 26 and these endless conveyor members are arranged in end-to-end relation. In the embodiment shown, transfer rolls 27 supported by suitable supports 27a are positioned between the ends of adjacent endless conveyor aprons 25 so that the upper surface of each roll is coplanar with the upper surface of the upper run of the endless conveyor aprons 25.

Means are provided for selectively removing the weight deficient sheets S from the reject conveyor and for conveying these weight deficient sheets to one of a plurality of weight adjusting stations. To this end, a plurality of transverse conveyors 28 are provided, each being positioned between the adjacent ends of a pair of adjacent apron conveyors 35.

The transverse conveyors 28 are comprised of ribbon conveyor elements 29 which are trained about suitable rollers 30. The rollers 30 for each transverse ribbon conveyor 28 are mounted at one end on a yoke 31, which, in turn, is rigidly connected to one end of a piston rod 32 whose other end is secured to a piston movable in a pneumatic cylinder 33. The piston and cylinder comprise a double acting pneumatic ram which is operable to shift the entire end portion of the associated transverse ribbon conveyor from a lowered inoperative position to a raised operative position.

In this regard, when the end portion of each transverse conveyor is in a lowered inoperative position, the sheets S with bacon slices thereon will be moved from one apron conveyor 25 to the adjacent transverse roll 27 and then upon the adjacent apron conveyor 25. The upper runs of the ribbon conveyor elements 29 of each transverse conveyor will be positioned below the upper surface of the adjacent apron conveyors and below the upper surface of the adjacent transverse roll 27 when the end portion of the associated transverse conveyor is in the lowered operative position.

However, when each transverse conveyor is elevated by its associated pneumatic ram, the upper runs of the associated ribbon conveyor elements will be disposed in substantial coplanar relation with respect to the apron conveyors 25 and will receive the sheets S from the apron conveyors to support the same for movement in right angular relationship with respect to the path of travel defined by the reject conveyor. It is pointed out that the piston rod of the pneumatic ram is returned to a lowered or retracted position when the next sheet passes in front of the associated photocell 38. Thus air is supplied to the pneumatic cylinder 33 to extend the piston rod and air is also supplied to the cylinder to cause retraction of the piston rod. Valve 41 is controlled by the photocell 38 to produce the extension and retraction of the piston rod.

It will be noted that the ribbon conveyor elements 29 for each transverse conveyor 28 is supported on a support plate 34 which terminates closely adjacent a weight adjusting station 35. The weight adjusting station 35 is provided with suitable scales and each weight adjusting station is operator controlled. It will further be noted that each weight adjusting station 35 is positioned closely adjacent the product acceptance conveyor 22 and, in the embodiment shown, the weight adjusting stations are arranged longitudinally along this product acceptance conveyor. It is preferred that five or six such stations be provided for each bacon slicing and weighing system. Thus each weight deficient sheet S removed from the reject conveyor will be conveyed to a weight adjusting station to permit the operator to adjust the weight of the bacon supported on the sheet by adding a strip or strips of bacon to such sheet. The operator then places the weight adjusted sheet upon the product acceptance conveyor and the sheet is then directed to the packaging station 23 where the sheets are enclosed in a suitable package in a well-known manner.

Means are provided for automatically removing the weight deficient sheets from the reject conveyor and for directing these sheets to one of the weight adjusting stations by means of the associated transverse conveyor 28. In the embodiment shown, a plurality of photo-electric sensing devices are positioned along the reject conveyor and it will be seen that each such sensing device is positioned closely adjacent each transverse conveyor but on the upstream side thereof. These photo-electric cell sensing devices includes a sender mechanism 36 which has a conventional photo-electric cell for generating a light signal and this sender device is connected by a suitable electrical conductor 37 to a source of electrical current. Each sensing device also includes a receiving mechanism 38 which is aligned with the associated sender mechanism and is positioned on the other side of the associated apron conveyor. The receiver mechanism 38 is connected to a source of electrical current by electrical conductors 39 and is also connected by suitable electrical conductors 40 to an electrically operated valve 41. The valve 41 is disposed in flow controlling relation with respect to an air supply conduit 42 which is connected in communicating relation to the pneumatic cylinder. Opening and closing the valve is controlled by the photo-electric cell sensing device.

In this regard, the sender device 36 transmits a beam or light signal to the receiver device 38. The light signal is transmitted adjacent or along the upper surface of the associated apron conveyor 25. When a sheet having bacon slices thereon interrupts the light signal, an electrical signal is transmitted to the valve 41 which is normally closed to intercommunicate the cylinder 33 with its source of air under pressure. The piston rod 32 is extended, thus raising the end portion of the adjacent transverse conveyor so that the sheets of bacon are directed to the associated weighing station 35.

However, in the present embodiment, the receiver mechanism 38 is preset to open the valve 41 after a predetermined number of sheets S with bacon slices thereon have interrupted the light signal. Thus in the embodiment shown, if there are five weighing stations and five transverse conveyors, the first photo-electric cell sensing device will count five interruptions of the light signal prior to operating the valve 41. The next adjacent photo-electric cell sensing device in a downstream direction will be preset to operate its associated valve after four interruptions. Therefore, each sensing device will be preset to remove the desired weight deficient sheet from the reject conveyor. Similarly, if there are ten such stations, then the receiver mechanism of each photo cell sensing device will be preset to operate in response to the passage of ten sheets of material thereby.

With this arrangement, the weight deficient sheets with bacon slices thereon are evenly distributed to the various weight adjusting stations and obviates the need for counting by the upstream operators of the weight adjusting stations.

From the foregoing description, it will be seen that we have provided a novel apparatus and process in which bacon is sliced and placed in shingle fashion on sheets in preparation for packaging, and the sheets with bacon slices thereon are then initially weighed to determine if the sheets meet the minimal weight standards. All of those sheets with bacon slices thereon that meet the minimal weight standards are then automatically and mechanically directed to a packaging station where these sheets are packaged in a well-known manner. Those weight deficient sheets are directed mechanically and automatically to a reject conveyor where the sheets are automatically and evenly distributed amongst several weight adjusting stations.

From the foregoing description, it will be seen that the present process and apparatus obviates the need in operators in counting the packages to be weighed and also eliminates weighing of packages which at least meet the minimal weight standards.

Thus it will be seen that the present process and apparatus, while being of simple and inexpensive construction and operation, functions in a more efficient manner than any heretofore known comparable system.

What is claimed is:

1. A process for slicing and weighing bacon for packaging comprising, slicing bacon into a plurality of thin slices and positioning the slices on a sheet of packaging material,
   conveying the sheets with the bacon slices thereon in a predetermined path of travel to a weighing station, and weighing each moving sheet and comparing the weight of each sheet to a predetermined weight to determine whether the weight of each sheet with bacon slices thereon is below said predetermined weight,
   continuing movement of those sheets with bacon slices thereon that have a weight at least equal to said predetermined weight in the predetermined path of travel to a packaging station,
   mechanically changing the direction of travel of those sheets with bacon slices thereon that have a weight below said predetermined weight,
   continuing movement in a new path of travel of the weight deficient sheets with bacon slices thereon and sensing the passage of each weight deficient sheet at predetermined spaced points along the new path of travel, and counting the passage (of each weight deficient sheet) by each of said points,
   mechanically engaging and moving selected of the weight deficient sheets at each of said predetermined points in response to the passage of a predetermined number of said weight deficient sheets by each of said points, and directing movement of each selected sheet to an operator controlled weighing station where the weight of each weight deficient package is adjusted to at least equal said predetermined weight,
   then moving said weight adjusted sheets along said original path of travel to the packaging station.

2. The process as defined in claim 1 wherein the weight deficient sheets are sensed in their travel by photoelectric sensing media.

3. An apparatus for slicing and weighing bacon for packaging comprising, a bacon slicing device for slicing a slab of bacon into thin slices and depositing a plurality of slices on a sheet of packaging material,
   a first conveyor device supporting and conveying said sheets with bacon slices thereon,
   a weighing device disposed adjacent one end of said first conveyor and receiving each sheet with the slices thereon from said first conveyor, and being operable to weigh each sheet, and compare the weight of each sheet to a predetermined weight,
   a directional control device positioned adjacent said weighing device,
   a product acceptance conveyor positioned adjacent said directional control device, the latter being operable to direct each sheet with bacon slices thereon which is at least equal to said predetermined weight to said product acceptance conveyor,
   a reject conveyor positioned adjacent said directional control device, the latter being operable to direct those sheets that weigh less than said predetermined weight to said reject conveyor,
   said reject conveyor device including a plurality of elongate endless conveyor members disposed in end-to-end relation,
   a plurality of similar transverse conveyors each being positioned between the ends of adjacent said endless conveyor members, and being angularly disposed with respect to said endless conveyor members, each transverse conveyor being shiftable between a lower inoperative position when the upper surface of each transverse conveyor is positioned below said conveyor members, to an operative upper position wherein the upper surface of said transverse conveyor is substantially coplanar with adjacent conveyor members, each transverse conveyor when in the inoperative lower position permitting the weight deficient sheets to be transferred from one of said endless conveyor members to the next adjacent endless conveyor member, and each transverse conveyor when in the operative position receiving a weight deficient sheet from an endless conveyor member to remove the weight deficient sheet from said third conveyor device,
   a plurality of conveyor shifting mechanisms, each being operably connected with one of said transverse conveyors and each being operable to shift its associated transverse conveyor from an inoperative lowered position to an operative position and to return the associated transverse conveyor to the inoperative position,
   a plurality of sensing mechanisms positioned at spaced points along said third conveyor mechanism and each being connected in controlling relation with one of said transverse conveyors, each sensing mechanism being operable in response to the passage of a plurality of weight deficient sheets to operate said conveyor shifting means to permit each transverse conveyor to remove selected sheets to be removed from said reject conveyor.

4. The apparatus as defined in claim 3 wherein said transverse conveyors each includes a plurality of elongate, endless ribbon conveyor elements.

5. The apparatus as defined in claim 3 wherein each of said conveyor shifting mechanisms comprises a pneumatic ram.

6. The apparatus as defined in claim 4 wherein each of said sensing mechanisms each comprises a photo-electric cell sensing mechanism, a plurality of valves each disposed in controlling relation with respect to one of said cylinders, and each photo-electric cell sensing mechanism operating one of said valves.

References Cited

UNITED STATES PATENTS

| | | | |
|---|---|---|---|
| 2,888,793 | 6/1959 | Folk | 146—94 B |
| 3,010,499 | 11/1961 | Dahms et al. | 146—95 X |

WILLIE G. ABERCROMBIE, Primary Examiner